March 24, 1959
S. D. LAWSON
2,879,224
SEPARATION OF SOLIDS FROM FLUIDS
Filed Aug. 13, 1954
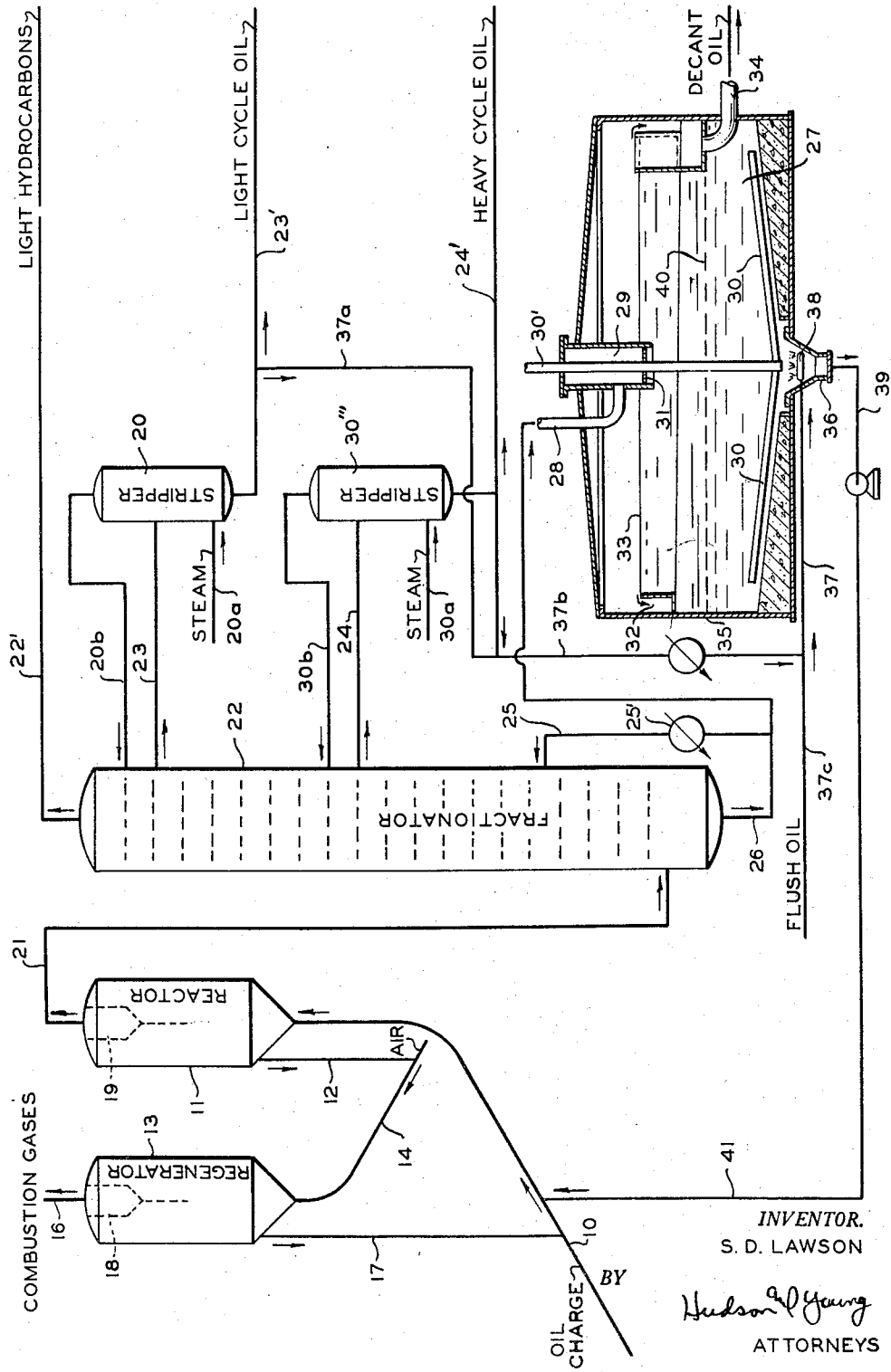
INVENTOR.
S. D. LAWSON
BY
Hudson & Young
ATTORNEYS

United States Patent Office 2,879,224
Patented Mar. 24, 1959

2,879,224

SEPARATION OF SOLIDS FROM FLUIDS

Shelby D. Lawson, Bartlesville, Okla., assignor to Phillips Petroleum Company, a corporation of Delaware Application August 13, 1954, Serial No. 449,648

18 Claims. (Cl. 208—100)

This invention relates to the separation of solids from fluids. In one aspect this invention relates to a method for separating finely divided solids from admixture with a fluid, by passing a displacing or flushing fluid in countercurrent flow contact relation with a body of the solids-fluid so as to displace fluid initially in contact with the solids. In one aspect this invention relates to a method for separating finely divided solids from admixture with a fluid, by passing a body of the solids-fluid into a settling zone and passing a displacing or flushing fluid upwardly into the said body in uniform contact therewith at a controlled rate of flow so as to displace the fluid initially present but not to preclude settling of solids from the said solids-fluid body. In one aspect this invention relates to the separation of finely divided solids from admixture with a fluid not easily separable from said solids, by displacing the fluid from the said admixture employing a flushing or displacing fluid therefor, and distilling flushing fluid from the residual solids. In another aspect this invention relates to the catalytic conversion of reactant materials. In another aspect this invention relates to the separation of undesirable oil by-product from admixture with catalyst from a hydrocarbon conversion step, by countercurrently contacting such a catalyst-oil mixture with a flushing or displacing liquid so as to permit replacement of the by-product oil with flushing liquid and so as to permit settling of catalyst from the zone of contact. In still another aspect this invention relates to a fluid catalytic hydrocarbon cracking process wherein catalyst is recovered from effluents as a slurry with a high coke-yielding oil, i.e., an oil easily cokable under the cracking conditions, and the latter is displaced from the slurry, by passing the said slurry into a settling zone and passing a low coke-yielding oil, i.e. one that is less easily cokable under the cracking conditions into the said slurry in contact therewith under controlled conditions of time and uniformity of contact to permit replacement of the high coke-yielding oil with the said less easily cokable oil and so as to allow settling of the catalyst particles from the zone of the said contacting as a slurry with the low coke-yielding oil, and wherein catalyst, in forming the latter slurry, is recirculated to the cracking zone.

In various catalytic conversion processes it is important for economic reasons to recirculate catalyst to the conversion zone. However, in many instances the catalyst in its form as recovered from effluents is not best suited for recirculation to the conversion zone due to adverse effects of by-product materials, associated therewith, on the conversion reaction and/or on the catalyst life. Thus, in the conversion of hydrocarbons, such as in fluid catalytic cracking, finely divided catalyst, in varying amounts dependent on the reaction conditions, is carried overhead from the cracking zone with vaporous effluent. In accordance with conventional practice that effluent is subjected to a scrubbing step separate from, or in a lower section of, an effluent fractionation zone, wherein a scrubbing liquid is contacted under condensing conditions with the effluent so that the heaviest components in the effluent stream are condensed, and catalyst particles entrained therewith are settled with the resulting condensate to form a catalyst slurry. This slurry can be returned to the cracking zone but it contains an undesirable cracking stock, because the oil is a high-coke yielding product under conditions of cracking and is converted into unduly large proportions of additional coke and/or carbonaceous deposits on the catalyst particles. Thus, generally, the catalyst particles entrained in the vaporous reaction product are recovered as a slurry in the bottoms in the fractionator and because the bottoms product is high coke-yielding under cracking conditions, it is disadvantageously recirculated to the cracking step. Thus, it is important that, prior to recirculating the catalyst to the cracking zone, it be separated from the said high coke-yielding oil by-product.

This invention provides for effecting separation of finely divided solids from their association with a fluid unsuitable therefor, the solids being recoverable alone or preferably as a slurry in conjunction with a flushing or displacing fluid by which the fluid, initially in contact with the solids, has been replaced. When desired, the flushing fluid is selected so as to be separable from the catalyst ultimately in contact therewith by any suitable means, as for example, distillation.

In accordance with this invention particulate solids are separated from admixture with a fluid unsuitable as a component of said admixture by passing into a body of such solids and fluid, a different fluid suitable for such admixture, in uniform contact therewith under conditions so as to permit settling of solids and replacement of the unsuitable fluid with the suitable fluid, such as by effecting countercurrent flow contact of added fluid with said fluid-solids body under time conditions and rate of vertical linear flow to permit said settling and said replacement, or by passing a body of said solids-fluid into a settler and introducing the displacing fluid upwardly into the said solids-fluid body at a rate so as to not preclude settling of solids but so as to effect replacement of the initially present fluid with the added fluid. Settled solids are recovered either as a slurry with the added fluid, substantially free from fluid initially in admixture therewith, or, dependent on the time of settling, as a susbtantially fluid-free mass. When desired, settled solids can be separated from residual fluid in contact therewith by any desired means, preferably by distillation. Such an embodiment is advantageously applied when the fluid initially associated with the solids is difficultly separable therefrom. This embodiment is, accordingly, advantageously applied to the separation of fluid from a fluid-solids mass, which fluid is not stable at its potential distillation temperatures and, if distillation is attempted, residual decomposition products deposit on the solids surface.

Further, in accordance with this invention, particulate catalyst recovered from a catalytic conversion system, in admixture with undesirable oily by-product, is freed from that by-product by passing a body of the catalyst and oily by-product in contact with a flushing or displacing liquid, preferably in countercurrent flow relation, under contact conditions carefully controlled so as to replace oily by-product admixed with the catalyst, with the flushing or displacing liquid, while at the same time permitting catalyst particles to settle, substantially free from oily by-product, preferably as a slurry with replacing liquid to facilitate further handling of the catalyst.

Still further in accordance with this invention, a slurry of catalyst and by-product oil recovered from processing effluents from fluid hydrocarbon catalytic cracking, the said by-product oil being high coke-yielding under conditions of the cracking and thereby rendering the slurry unsuitable for recycle to the cracking step, is passed into a settling zone and therein catalyst particles are permitted to settle while at the same time a flushing oil, low coke-yielding under the said cracking conditions, is introduced into the slurry at a lower point therein and passed upwardly and laterally in said slurry so as to effect uniform contact of added fluid with said slurry and so as to not preclude settling of the catalyst, whereby the high coke-yielding oil by-product is replaced by the upwardly moving oil. The settled catalyst is substantially free from the high coke-yielding by-product and is in form of a slurry with the flushing oil, the latter slurry being advantageously withdrawn from the settling zone and passed to the cracking step. This embodiment provides, therefore, for a continuous recycle of catalyst recovered from cracking effluents without the introduction of high coke-yielding oil by-product therewith, which, if otherwise recycled to the cracking zone, would cause excessive coke formation in the cracking zone with concomitant increase in catalyst regeneration requirements and decrease in effective catalyst life.

My invention is further illustrated with reference to the attached diagrammatic drawing wherein is illustrated one embodiment, namely, that of separating catalyst from a by-product oil in a catalytic hydrocarbon cracking system. Thus, a suitable hydrocarbon cracking stock such as a gas oil boiling in the range of 450 to 850° F. is introduced via line 10 into reactor 11 in contact therein with a suitable cracking catalyst such as Super Filtrol natural catalyst under cracking conditions as, for example, a temperature in the range of 875 to 940° F. for a suitable time such as from 30 to 80 seconds whereby it is converted to cracking product. Catalyst partially spent in reactor 11 is withdrawn as a side stream via line 12 and passed into catalyst regeneration zone 13 together with air via line 14 for combustion regeneration, i.e., to remove carbonaceous materials from the catalyst surface to reactivate same. Effluent regeneration gas is passed from zone 13 via line 16. Regenerated catalyst is withdrawn from zone 13 via line 17 and passed into line 10 wherein it is passed together with charge into zone 11. Conventional cyclone separator means 18 is employed in zone 13 to minimize flow of fine catalyst particles through line 16. Total vaporous effluent is passed from zone 11 via cyclone separator 19 into effluent line 21 and passed into effluent fractionator 22, initially into a lower portion thereof wherein it is first scrubbed with a liquid cooled to a temperature sufficiently low as to cause condensation of the highest boiling vaporous components. These components, referred to hereinafter as high coke-yielding by-product oils, contain entrained therewith substantially all catalyst particles discharged with effluent via line 21. Thus "bottoms" in zone 22 comprises a slurry of cracking catalyst and "high coke-forming" by-product oil, i.e., which oil yields large amounts of coke under the cracking conditions in zone 11 and is, therefore, not desirable for recycle to zone 11. Effluents substantially free from catalyst are fractionated in the remaining upper portion of zone 22 under conventional fractionating conditions therefor, to provide light hydrocarbon product 22', a light cycle oil product withdrawn via line 23 and a relatively heavy cycle oil product withdrawn via line 24.

Catalyst slurry is withdrawn from fractionator 22 via line 26 and in relatively small proportion is passed via line 25 and cooler 25' into zone 22 as scrubbing liquid for effecting condensation of heavy by-product oils and for scrubbing catalyst particles for recovery in the slurry, as described.

Catalyst slurry from line 26, not passed into line 25, is introduced into settling zone 27 by way of line 28, feed well 29 and perforate plate 31. Settler 27 in conjunction with other elements shown and discussed hereinafter is typical of apparatus known in the art and ordinarily employed as a "thickener," one such type being often referred to as a Dorr thickener. Launder 32, peripherally disposed about the inner side wall 35 of the settler assembly, is sloped downwardly toward decant oil outlet 34.

Attached to launder 32 is adjustable weir 33 which is maintained level to allow separated oil, as described hereinafter, to flow evenly into the launder 32 throughout the periphery of the vessel. Catalyst slurry from line 28 in settler 27 is maintained therein under conditions so as to permit catalyst to settle from the oil in admixture therewith and to accumulate in a lower most portion of settler 27. Thus, in the further operation of settler 27, scrapers 30 are rotated by shaft 30' to which a rotating force is applied, whereby the flow of settled catalyst together with liquid in admixture therewith is facilitated for withdrawal from the settler via cone 36.

If the conventional system above illustrated were employed, catalyst withdrawn via cone 36, in form of a slurry, would comprise catalyst and oil by-product described above, the latter being high coke-yielding under cracking conditions in zone 11 and being, therefore, not suitable for recirculation to zone 11 or to regeneration zone 13 as the case may be. It is, therefore, a feature of one form of this invention that the catalyst recovered in settler 27 is free from high coke-yielding oil by-products initially in contact therewith in line 28. Accordingly, a flush or displacement oil such as a heavy cycle oil is introduced via line 37 into cone 36, preferably in the form of an atomized spray 38, and passed upwardly through settler 27 in contact with slurry therein from line 28 laterally and upwardly at an upward linear velocity carefully controlled so that settling of catalyst particles in settler 27 is not precluded but whereby high coke-yielding oil therein is displaced from its association with catalyst particles, by the flushing oil, and is driven toward an upper portion of settler 27 and maintained therein as a clear decant oil and ultimately withdrawn from settler 27 by way of overflow into launder 32 and withdrawn via line 34. Flush oil introduced via line 37 is a "low coke-forming oil," that is to say, it yields only small amounts of coke under cracking conditions employed in zone 11. The function of the flush oil in settler 27 is to displace the by-product oil or in any event to wash it free from catalyst in contact therewith so that catalyst particles moved from settler 27 into line 39 are substantially free from the said by-product oil but are in admixture with at least a portion of the flush oil introduced via line 37, as a catalyst-flush oil slurry.

Catalyst-flush oil slurry is withdrawn via cone 36 and line 39 and recirculated to cracking zone 11 via line 41.

It is thus a feature of my invention that an admixture, or slurry, of finely divided solids with a fluid, is contacted with a flush or displacing fluid under specific countercurrent flow conditions by which an efficient separation of solids from the said fluid is achieved. Thus, when slurry is withdrawn via line 39 and clear decant oil is withdrawn via launder 32, oil flush or displacement oil is introduced into the system via line 37 and slurry from zone 22 is introduced into settler via line 28, I have provided for separating finely divided solids from admixture with a fluid unsuitable as a component of such admixture, the contacting conditions being necessarily controlled at all times so as to effect the uniform contact of flushing oil with slurry while at the same time passing the flush oil into the said slurry at such a low predetermined rate of vertical linear flow that settling of solids particles is not precluded but whereby substantially complete replacement of fluid by the flushing fluid is achieved and solids withdrawn from the system are substantially free from fluid initially in admixture therewith.

Thus, in the practice of one form of this invention, flush oil is introduced into settler 27 at such a low rate that substantially complete displacement of fluid occurs in a central portion of settler 27 such as indicated by the dotted line 40 which can be looked upon as an upper boundary of a zone of reflux, i.e., above which there is substantially only the displaced decant oil, i.e., the high coke-yielding oil from line 28 which is ultimately withdrawn via launder 32 and conduit 34.

In the practice of the latter embodiment illustrated with reference to dotted line 40, a minimum quantity of flush oil is employed, and substantially no flush oil is carried from the system in admixture with decant oil via line 34.

In carrying out this embodiment, it is particularly important that the specific gravity of the flush oil employed be controlled to within a predetermined range as, for example, from about 1.01 to 1.30 times the specific gravity of the high coke-yielding oil contacted therewith. Thus, when the decant oil has a specific gravity as, for example, about 0.87 at 425° F., the flush oil should have a specific gravity of about 0.89 at 100° F. In the practice of another form of this invention, if desired, it is only necessary that a sufficient amount of flush oil be employed so as to wash the solids particles substantially free from the liquid initially in contact therewith. In that event, the decant oil is flushed from contact with solids and removed from the settler but is accompanied by an amount of flushing oil dependent upon the specific washing conditions employed. In the practice of this embodiment, there is no line of demarcation such as represented by dotted line 40 and although some flushing oil is lost from the system via line 34, it is not necessary to effect control on the specific gravity of the displacing oil, and a less valuable displacement oil may be utilized.

Any suitable flush or displacement fluid can be employed in the practice of this invention dependent, of course, upon the specific solids-fluid mixture to be treated. However, any given flush or displacement fluid can be employed over a controlled range of specific gravity by merely adjusting temperature thereof. Exemplary of various flush fluids that can be employed are light cycle oils, heavy cycle oils, gas oils, or mixtures thereof.

Temperatures employed in effecting the countercurrent flow process of this invention are, of course, dependent upon the specific solids-fluid (e.g., from line 28). However, as applied to separation of solids from slurry such as that in line 28 of the attached drawings, it is generally advantageous to employ a temperature in settler 27 in the range of about 200 to 450° F. It is important that the rate of inflow of flush or displacement oil to settler 27 be at all times controlled so that the vertical linear velocity of the added oil does not exceed that which precludes settling of solids particles in zone 27. Thus, as applied to the system illustrated, a vertical linear velocity of flush oil from line 37, in settler 27, is maintained generally below about 1.0 foot per hour when it is desired to effect substantially complete displacement of by-product oil in settler 27, i.e., without there being displacement oil withdrawn via line 34. When it is intended that higher linear velocities be employed so as to effect washing of the solids particles with concomitant carry-over of displacement oil into conduit 34, vertical linear velocities of displacement oil in settler 27 above about 1.0 foot per hour are employed.

It is an important feature of this invention that, as applied to catalytic cracking of hydrocarbons, a low carbon-forming oil, preferably having its gravity adjusted by temperature control, is employed to displace high carbon-forming oil from withdrawn catalyst in order that substantially no high coke-forming oil is returned to the cracking system with catalyst to be recirculated thereto. The following tabulation is illustrative of one set of conditions characteristic of operation of the embodiment described above with reference to the drawings.

Slurry charge, line 28 _____ ° F__ 400–450
  (a) "Decant" oil _____ b./h__ 100
    Specific gravity at 425° F. _____ 0.87
  (b) Catalyst, 2100 pounds or 0.5#/gallon.
Flush oil, line 37 _____ ° F__ 90–110
  (a) Heavy cycle oil _____ b./h__ 100
    Specific gravity at 100° F. _____ 0.89

Charge to reactor 11:
  (a) Heavy cycle oil _____ b./h__ 90
  (b) Catalyst, 2054 pounds or 0.54#/gallon.
Decanted oil, line 34 _____ b./h__ 100
  (a) "Decant" oil—100 b./h.
  (b) Heavy cycle oil—10 b./h.
  (c) Catalyst, 46 pounds or 0.01#/gallon.

It is a further feature of this invention that upon recovery of slurry such as from cone 36, i.e., any slurry of solids with flush or displacement fluid, although it can be recirculated to the conversion system, can be resolved into the solids and fluid components such as by distillation, thereby providing for an ultimate separation of solids from fluid initially in contact therewith.

Although the linear velocity of flush oil passed through the settler is dependent upon the specific slurry, i.e., the specific high coke-forming oil, the specific gravity of the catalyst particles, the specific flush oil employed and the like, the linear velocity of flush oil introduced into the settler is generally within the range of from 0.5 to 1.0 foot per hour or about 0.5 to 1.0 cubic foot per cubic foot of slurry per square foot of settling area per hour; a linear velocity of about one foot per hour or about one cubic foot of flush oil per cubic foot of slurry per square foot of settling area per hour being often employed. Linear velocities of displacing oil outside the numerical range stated with reference to treating a slurry from hydrocarbon cracking can be employed, particularly when the solids-fluid mixture is from a source other than hydrocarbon cracking and particularly when it is in fact a non-hydrocarbon mixture.

Although I have described my invention in terms of adding the displacing fluid, preferably as a spray, at a point in the cone of the settler system, as illustrated, the displacing fluid can be introduced in any desired manner so as to maintain the said fluid in uniform contact relation with the slurry to be treated. In one form, the displacing fluid can be introduced into the settling zone at selected points as separate streams of finely divided particles, advantageously in an upward direction. Such an assembly of inlets in one form is a plurality of spray nozzles extending laterally across the settling zone, spaced from the bottom thereof so as to permit settling of solids together with replacing liquid to a point below the inlet spray system.

In another embodiment displacing liquid can be introduced into the settler as a plurality of streams through a perforate plate, adapted to receive replacing fluid from the fluid inlet conduit, the said perforate plate having progressively larger perforations from its central portion toward its outer extremities, all of relative size, so that an upward uniform rate of flow of replacing liquid in the settler is achieved.

Any suitable displacing or flush oil can be employed. However, the light cycle oil fraction withdrawn from fractionator 22 via line 23 can be employed in part or in whole as the said flushing oil. Light cycle oil in line 23 is preferably, for this purpose, passed first to steam stripper zone 20 wherein it is passed in countercurrent contact with steam, under stripping conditions, from line 20a, the latter then being passed to fractionator 22 via line 20b. Light cycle oil, steam stripped of light ends, and boiling generally within a range of 400 to 650° F. is withdrawn from the system via line 23'. Steam stripped light cycle oil from vessel 20 is advantageously employed as the flush oil in line 37, alone or together with flush oil from line 37 and/or a heavy cycle oil from line 24 as described hereinafter. Thus, when so employed, steam stripped light cycle oil from stripper 20 is admitted into line 37 via line 37a.

A heavy cycle oil fraction recovered as a fractionation product in zone 22, withdrawn via line 24, can be employed as a flush oil alone or together with light cycle oil in line 37a and/or flush oil introduced into line 37 via line 37c. Thus, when so employed, heavy cycle oil in line 24 is passed to steam stripper 30''' wherein it is passed in countercurrent contact with steam from line 30a under stripping conditions. Steam from zone 30''' is passed together with light ends to fractionator 22 via line 30b. Heavy cycle oil, steam stripped of light ends, and boiling within a range of about 550 to 800° F. is withdrawn from stripper 30''' via line 24'.

Steam stripped heavy cycle oil from vessel 30''' can be advantageously employed as a displacing or flushing oil, alone or together with flush oil from line 37c and/or light cycle oil from stripper 20, as above discussed, being in that event introduced into line 37 via line 37b.

Reasonable variation and modification are possible within the scope of the foregoing disclosure, drawing, and the appended claims to this invention, the essence of which is that (1) particulate solids are separated from a fluid in admixture therewith by passing into contact with a body of such solids and fluid, a flushing fluid under conditions so as to permit settling of solids and replacement of the fluid initially in contact with said fluid with the flushing fluid, the said contacting being conducted in a manner such as by countercurrently contacting added fluid with the said fluid-solids body under time conditions and rate of vertical linear flow to permit said settling and said replacement, or, by passing a body of said solids-fluid to a settler and introducing the displacing fluid upwardly into the said solids-fluid body at a rate so as to not preclude settling of solids but so as to effect replacement of the initially present fluid with the added fluid; this invention being advantageously applied to the separation of particulate catalyst from a catalyst slurry recovered from a catalytic conversion step; and (2) in a preferred form, a slurry of catalyst and by-product oil recovered from processing effluents from fluid hydrocarbon cracking, the said by-product oil being high coke-yielding under conditions of the cracking and thereby rendering the slurry unsuitable for recycle to the cracking step, is passed into a settling zone and therein catalyst particules are permitted to settle while at the same time a flushing or displacing oil, low coke-forming under the said cracking conditions, is introduced into the slurry at a lower point therein and passed upwardly and laterally in said slurry so as to effect uniform contact of added oil with said slurry and so as to not preclude settling of the catalyst, whereby the easily cokable oil by-product is replaced by the upwardly moving oil and catalyst is settled substantially free from high coke-yielding oil by-product and is in form of a slurry with the added oil, the latter slurry being then advantageously withdrawn from the settling zone and passed to the cracking step.

I claim:

1. A process for the separation of particulate solids from admixture with a first fluid, comprising passing a body of such solids and said first fluid into a settling zone under conditions therein for settling said solids, passing a different second fluid into said body of such solids and said first fluid in uniform contact therewith and controlling the rate and amount of flow of said second fluid into said body so as to maintain said settling and to replace said first fluid in said body, and recovering settled solids in admixture with said second fluid from said settling zone substantially free from said first fluid.

2. A process for the separation of particulate solids in admixture with a first fluid not readily separable from said solids by ordinary distillation, comprising contacting the body of solids and said first fluid in a settling zone with a second fluid readily separable from said solids by distillation, so as to displace the said first fluid from admixture with said solids, recovering said second fluid in admixture with said solids, and separating the said second fluid from resulting contact with said solids.

3. The process of claim 2 wherein said second fluid in admixture with said solids is separated from said solids by distillation.

4. In a catalytic conversion wherein fluid by-product of said conversion is admixed with particulate catalyst previously employed in said conversion, and said catalyst is to be recovered free from said by-product, the improvement comprising passing a fluid capable of replacing said by-product in said catalyst admixture, in uniform countercurrent contact flow relation with said admixture under time conditions providing for replacement of said by-product with replacing fluid but permitting settling of said catalyst, whereby catalyst settles in admixture with at least a portion of said replacing fluid, and recovering resulting catalyst in said replacing fluid free from said by-product.

5. In the fluid catalytic cracking of hydrocarbons, wherein a by-product oil is formed and is recovered from the conversion zone together with catalyst as a slurry, and said catalyst is freed from said by-product oil by contacting said slurry with an oil to replace said by-product oil, the improvement comprising passing the said replacing oil in uniform countercurrent contact flow relation with said slurry under controlled time conditions so as to cause separation of catalyst from said by-product oil and to cause catalyst thus separated to settle together with at least a portion of said displacing oil, and recovering resulting catalyst in said displacing oil free from said by-product.

6. The process of claim 5 wherein catalyst thus separated and containing said displacement oil is recycled as a slurry to the cracking zone.

7. In the fluid catalytic cracking of hydrocarbons wherein vaporous effluent contains suspended particles of catalyst together with by-product oil, wherein said by-product oil is recovered as a slurry with catalyst as a result of processing of said effluents, the said by-product oil being high coke-yielding under the conditions of said cracking and thereby rendering the said slurry unsuitable for recycle to the cracking step, the improvement comprising passing said slurry into a settling zone and therein allowing catalyst particles to settle by gravitation, passing a flushing oil low coke-yielding under conditions of said cracking, laterally and upwardly into said slurry at an initial low point therein so as to effect uniform contact of flushing oil with said slurry at a rate of vertical linear flow not precluding settling of catalyst and providing for recovery of catalyst as a slurry with said flushing oil, separating settled catalyst substantially free from said high coke-yielding oil as a slurry with said flushing oil, and passing the last said slurry to the cracking system for reuse of said catalyst therein.

8. In the vapor-phase fluid catalytic cracking of hydrocarbons wherein by-product oil, easily converted to coke under conditions of said cracking, is discharged together with catalyst in vaporous cracking effluent, and is recovered as a slurry with said catalyst, and wherein said by-product oil is to be displaced from said slurry by a flushing oil not easily converted to coke under said cracking conditions, the improvement comprising introducing said flushing oil into uniform countercurrent contact flow relation with said slurry, maintaining said uniform contact under relative rates of flow of said slurry and flushing oil so that catalyst particles freed from said heavy oil are caused to settle in the zone of said contacting together with at least a portion of said flushing oil, and passing settled catalyst together with flushing oil associated therewith as a recycle stream to the cracking system, whereby catalyst passed with effluent from said cracking is recycled to said cracking substantially free from high coke-yielding oil by-product initially associated therewith as described.

9. The improvement of claim 8 wherein said displacement of by-product oil with flushing oil takes place in a central zone of reflux, above which substantially no flushing oil is present.

10. The improvement of claim 8 wherein said cracking effluent is distilled to produce distillate product and said slurry is recovered as residual product of said distillation, and wherein at least a portion of said distillate product is employed as said flushing oil.

11. The improvement of claim 10 wherein said distillate comprises a light cycle oil boiling in the range of about 400 to 650° F.

12. The improvement of claim 10 wherein said distillate comprises a heavy cycle oil boiling in the range of about 550 to 800° F.

13. In the vapor-phase fluid catalytic cracking of hydrocarbons wherein by-product oil, easily converted to coke under conditions of said cracking, is discharged together with catalyst in vaporous cracking effluent, and is recovered as a slurry with said catalyst, and wherein said by-product oil is to be displaced from said slurry by a flushing oil not easily converted to coke under said cracking conditions, the improvement comprising passing said slurry into a settling zone, introducing said flushing oil as a spray into said zone at a point in a lower portion thereof, laterally and upwardly dispersing said flushing oil in said slurry to effect uniform contact of flushing oil with said slurry, controlling the rate of flow of said flushing oil so as to not exceed that which precludes catalyst particles from settling in said settling zone, whereby said by-product oil is replaced by said flushing oil and catalyst particles free from said by-product oil settle as a bottom layer in said settling zone together with at least a portion of said flushing oil and wherein displaced by-product oil substantially freed from catalyst forms a top layer in said settling zone, decanting catalyst-free by-product oil from said top layer, and passing a stream from said bottom layer in settling zone as a recycle stream to said cracking.

14. Apparatus comprising a settling chamber; a first conduit means for introducing a first fluid containing solids into an upper portion of said chamber so as to form an upper layer of said first fluid within said chamber; a second conduit means for introducing a second fluid into said chamber at a point adjacent the bottom of said chamber so as to form a lower layer of said second fluid within said chamber; fluid dispensing means in said chamber connected with said second conduit means and adapted to disperse fluid from said second conduit means upwardly and uniformly through the horizontal cross-section of the lower portion of said chamber; a third conduit means connected with said chamber at a point above the point of introduction of said second conduit means for withdrawing said first fluid from within said chamber free from admixture with said second fluid and with said solids; and a fourth conduit means connected with said chamber at a point below the point of introduction of said second conduit means for withdrawing said second fluid containing said solids introduced into said chamber in admixture with said first fluid and free from admixture with said first fluid.

15. Apparatus of claim 14 wherein said dispersing means is a spray system for atomizing fluid from said second conduit.

16. Apparatus of claim 14 wherein said dispersing means comprises a plurality of conduits disposed across the interior of said chamber and adapted to disperse fluid from said second conduit upwardly through said chamber.

17. Apparatus of claim 14 wherein said dispersing means is a perforate plate adapted to receive upwardly flowing fluid from said second conduit, extending laterally across a central portion of the interior of said chamber, and wherein the perforations are of progressively larger cross section from a central portion of said plate to its outer extremities.

18. Apparatus of claim 14 containing scraper means adapted to be moved in a lower portion of said chamber so as to direct flow of fluid for withdrawal from said chamber through said fourth conduit.

References Cited in the file of this patent
UNITED STATES PATENTS

| | | |
|---|---|---|
| 530,897 | McClelland | Dec. 11, 1894 |
| 2,431,499 | Palmer | Nov. 25, 1947 |
| 2,447,149 | Wier | Aug. 17, 1948 |
| 2,483,706 | Lind | Oct. 4, 1949 |
| 2,537,904 | McAllister | Jan. 9, 1951 |
| 2,689,209 | Blair | Sept. 14, 1954 |
| 2,728,641 | Thorp et al. | Dec. 27, 1955 |